(12) United States Patent
Jiang

(10) Patent No.: US 6,975,359 B2
(45) Date of Patent: Dec. 13, 2005

(54) METHOD AND SYSTEM FOR MOTION AND EDGE-ADAPTIVE SIGNAL FRAME RATE UP-CONVERSION

(75) Inventor: Jiande Jiang, San Jose, CA (US)

(73) Assignee: Trident Microsystems, Inc., Sunnyvale, CA (US)

( * ) Notice: Subject to any disclaimer, the term of this patent is extended or adjusted under 35 U.S.C. 154(b) by 459 days.

(21) Appl. No.: 10/132,746

(22) Filed: Apr. 25, 2002

(65) Prior Publication Data

US 2004/0130661 A1 Jul. 8, 2004

(51) Int. Cl.$^7$ ................................................. H04N 7/01
(52) U.S. Cl. ...................................... 348/348; 348/452
(58) Field of Search .............................. 348/452, 448, 348/450, 449, 451, 454, 446, 441

(56) References Cited

U.S. PATENT DOCUMENTS

| | | | |
|---|---|---|---|
| 4,609,941 A | | 9/1986 | Carr et al. |
| 4,989,090 A | * | 1/1991 | Campbell et al. ........... 348/451 |
| 5,221,966 A | | 6/1993 | Clayton et al. |
| 5,349,385 A | | 9/1994 | Glenn et al. |
| 5,404,170 A | | 4/1995 | Keating |
| 5,504,531 A | * | 4/1996 | Knee et al. .................. 348/452 |
| 5,936,676 A | * | 8/1999 | Ledinh et al. ............... 348/452 |
| 5,995,154 A | * | 11/1999 | Heimburger ................. 348/448 |
| 6,104,755 A | | 8/2000 | Ohara et al. |
| 6,181,382 B1 | * | 1/2001 | Kieu et al. ................... 348/459 |
| 6,233,277 B1 | * | 5/2001 | Ozcelik et al. ......... 375/240.02 |
| 6,414,719 B1 | * | 7/2002 | Parikh ......................... 348/448 |
| 6,421,090 B1 | * | 7/2002 | Jiang et al. .................. 348/452 |
| 6,501,482 B1 | * | 12/2002 | Rosman et al. .............. 345/587 |
| 6,690,427 B2 | * | 2/2004 | Swan .......................... 348/448 |

FOREIGN PATENT DOCUMENTS

| | | |
|---|---|---|
| EP | 0 444 947 | 9/1991 |
| EP | 0 662 767 B | 9/1998 |

OTHER PUBLICATIONS

European Search Report dated Apr. 15, 2005 corresponding to a related European Patent Application No. 03252652.7.

* cited by examiner

*Primary Examiner*—Paulos M. Natnael
(74) *Attorney, Agent, or Firm*—DLA Piper Rudnick Gray Cary US LLP (57) ABSTRACT

A method and system for edge-adaptive frame rate up-conversion are disclosed. One embodiment of the system of the present invention comprises: a capture block for receiving and processing an input signal; a frame buffer to receive and process a data signal output from the capture block; an edge-adaptive interpolator to generate an interpolated field signal from a set of current input field signals output from the frame buffer; a motion detector to receive a composite signal output from the frame buffer and to process the composite signal to generate a motion signal; a blender to receive a prior input field signal from the frame buffer, the interpolated field signal from the edge-adaptive interpolator, and the motion signal, and generate an edge and motion-interpolated field signal; a synchronization control block to process an input vertical synchronization signal received from the capture block and generate an output synchronization signal and an output field parity signal; a comparator to receive and compare the output field parity signal and an input field parity signal output from the capture block; and a multiplexer to select, based on the output of the comparator, and provide as an up-converted output signal, either one of the set of current input field signals output from the frame buffer or the edge and motion-interpolated field signal. The input signal can comprise a PAL video signal at 50 Hertz. The up-converted output signal can comprise, for example, a 60 Hertz PAL output signal or a 75 Hertz PAL output signal.

7 Claims, 6 Drawing Sheets

|     | $t_1$ |     | $t_2$ |     | $t_3$ |     |     |     |
|-----|-------|-----|-------|-----|-------|-----|-----|-----|

| 0 | 0 | 0 | 0 | 0 | 0 | 0 | 0 | 0 | 0 |
|---|---|---|---|---|---|---|---|---|---|
| 0 ⌒25 | 0 | 0 | 0 | 0 | 0 | 0 | 0 | 0 | 0 |
| 0 | 0 | 0 | 128 | 0 | 0 | 128 | 255 | 128 | 128 |
| 255 | 255 | 128 | 255 | 255 | 255 | 255 | 255 | 255 | 255 |
| 255 | 255 | 255 | 255 | 255 | 255 | 255 | 255 | 255 | 255 |
| 255 | 255 | 255 | 255 | 255 | 255 | 255 | 255 | 255 | 255 |
| Output field Number | 0 | 1 | 2 | 3 | 4 | 5 | 6 | 7 | 8 | 9 |
| Output Field parity | 0 | E | O | E | O | E | O | E | O | E |
| From which Input Field | O0 | E0 | E0 | O1 | E1 | E1 | O2 | E2 | E2 | O3 |

FIG. 4

Previous Input Field    Current Input Field

Solid lines: video lines of the input video field
Dashed line: video lines that needed to be
created from the incoming video X_motion = (edge adaptive or simple vertical interpolation between line A and line B)
X_static = C
X = (1 − motion)·X_static + |motion|· X_motion

FIG. 5

Lines of the current field  Missed lines of the current field which will be generated using motion and edge adaptive interpolation

FIG. 8

| | | | | | | | | | |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 255 | 0 | 255 | 255 | 255 | 255 | 255 | 255 | 255 | 255 |
| 255 | 255 | 255 | 255 | 255 | 255 | 255 | 255 | 255 | 255 |
| 255 | 255 | 255 | 255 | 255 | 255 | 255 | 255 | 255 | 255 |
| 0 | 1 | 2 | 3 | 4 | 5 | 6 | 7 | 8 | 9 |
| 0 | E | * | * | * | E | 0 | * | * | * |
| 0 | E0 | E0 | O1 | E1 | E1 | O2 | E2 | 0 | E |
| O0 | E0 | E0 | O1 | E1 | E1 | O2 | E2 | E2 | O3 |

Output field Number / Output Field parity / From which Input Field — 26

METHOD AND SYSTEM FOR MOTION AND EDGE-ADAPTIVE SIGNAL FRAME RATE UP-CONVERSION

TECHNICAL FIELD OF THE INVENTION

This invention relates generally to the field of display devices and, more particularly, to the field of video signal processing. Even more particularly, the present invention relates to a method and system for motion and edge adaptive signal frame rate up-conversion.

BACKGROUND OF THE INVENTION

Conventional display monitors typically present video images in the form of a rapid sequence of video fields, changed at a high frequency to create the illusion of motion. Television cameras and other sources of video generally do not produce full-frame images, but instead such video sources typically produce a field consisting of about half of the lines of each full-frame image, at a rate of, for example, 60 such fields per second (in one interlaced system). Alternate fields contain alternate lines of video data. In other words, one field contains the odd numbered lines and the next field contains the even numbered lines. Accordingly, each field of a video image may be identified as an "odd" field or an "even" field.

In a typical interlaced system, the sequence of video fields thus alternates between the odd fields and the even fields. A conventional display monitor receiving the sequence of fields reproduces each video field in the sequence. Each field is displayed on the display screen, such as a television screen, on only half of the scan lines. For example, first an odd field is displayed, using the odd-numbered scan lines, and then an even field is displayed using the even-numbered scan lines, and so on. The display scans a raster across the screen from the top left to the top right producing a first scan line, and then returns the raster to the left edge of the screen to a position slightly below the original position. The position to which the raster returns, however, is not immediately below the first scan line, but allows sufficient space to accommodate an intervening scan line on the alternate field. The raster then scans across to the right edge of the screen to produce a second scan line, and continues in this manner to the bottom edge of the screen.

The distance between the scan lines is a function of the size of the monitor, but generally allows an intervening scan line (the first scan line of the other field) to be drawn after the completion of the first field. The invisible return of the raster to the left edge of the screen after scanning each scan line is a fly-back or horizontal refresh stage that occurs much more rapidly than the visible left-to-right lines. In this manner, approximately 525 active scan lines may be produced (e.g., in the predominate video format of the United States) to complete a single video frame, half of which is displayed in each field.

Once reaching the bottom edge of the screen, the raster is invisibly returned to the original position at the top left corner during a "vertical blanking interval" stage. The horizontal and vertical blanking interval stages are high speed and invisible. With respect to a conventional television, this interlaced video scanning approach is an appropriate compromise between vertical refresh rate, vertical resolution, and limited bandwidth.

Although widely adopted, these methods for alternating between an odd frame and an even frame used by conventional television systems are well known to have various disadvantages, such as line flicker, line crawl, dot crawl, limited horizontal resolution, visible line structure and large area flicker. In the predominate United States display standard, the most visible problem is line flicker and visible line structure. This is due to the limited number of scan lines (i.e., 525 lines per frame). For the predominate display standard outside of the United States, the visible line structure is better due to a greater number of scan lines (625 lines). Large area flicker, however, is more obvious due to a refresh rate of only 50 Hertz. This is especially the case with large-screen televisions whose brightness and contrast is very high. With the demand for large-screen displays increasing, these problems will only become even more apparent and, hence, more critical to overcome.

The video signal provided to a video display system can be in the form of a composite video signal. A composite video signal can be an NTSC signal (the predominate United States standard), a PAL signal, or any other such signal as known to those in the art. NTSC stands for National Television Standards Committee and defines a composite video signal with a refresh rate of about 60 half frames (interlaced) per second. Each frame contains 525 lines and can contain 16 million different colors. A composite video signal provided as an input can also be a signal for a high definition ready television, that can provide much better resolution than current television standards based on the NTSC standard. PAL stands for Phase Alternating Line, the dominant television standard in Europe. Whereas, NTSC delivers 525 lines of resolution at 60 half frames per second, PAL delivers 620 lines at 50 half frames per second. The PAL and NTSC specifications are well-known to those in the art.

Various technologies have been developed to overcome these drawbacks of conventional television signals. For example, interlace-to-progressive conversion (also known as interlace-to-non-interlace conversion) can be used on a NTSC signal to remove line flicker and visible line structure. For a PAL signal, signal frame rate up-conversion is a means to increase the refresh rate to suppress large area flicker. Up-converting a 50 Hertz interlaced input to, for example, a 100 Hertz interlaced output is a widely accepted practice and can provide good picture quality on an interlaced PAL display system. However, the cost of a 100 Hertz PAL display can be very high. This is because a 100 Hertz PAL display requires a different, more expensive, picture tube and a more complex scan circuit than a typical 50 Hertz PAL television system. For example, today a 29-inch, 100 Hertz PAL television in a Chinese market costs approximately $1,000, while a conventional 29-inch, 50 Hertz PAL television typically costs around $250.

The higher cost of a 100 Hertz PAL television as described is due mainly to the complex scan circuit and picture tube. In a PAL television, large area flicker is a serious problem. To remove the flicker, the frame rate can be increased, e.g., to 100 Hertz as discussed above, which is widely accepted but expensive. It has been found, however, that large area flicker can be diminished even with smaller incremental refresh rate increases over the 50 Hertz refresh rate typical for a PAL system. A 60 Hertz or higher refresh rate has been found to reduce large area flicker such that for a live picture there is very little difference in quality between a 60 Hertz and 100 Hertz refresh rate PAL television output signal. A television with an up-converted interlaced 60 Hertz or higher vertical refresh rate output (less than 100 Hertz) from a 50 Hertz input PAL signal will have a scan rate that is much lower compared to that of a 100 Hertz vertical refresh rate television system. The cost for this kind of television system will thus be greatly reduced as compared to a 100 Hertz output system, while providing a comparable quality display signal. This is because the same tube and scan circuit can be used for a 60 Hertz or a 75 Hertz up-converted system as can be used with a 50 Hertz PAL television system.

SUMMARY OF THE INVENTION

Therefore, there is a need for a method and system for edge-adaptive signal frame rate up-conversion that can be used to convert a 50 Hertz vertical refresh rate interlaced input signal to a 60 Hertz or higher vertical refresh rate output signal using the same or comparable scan circuit and picture tube as a 50 Hertz system.

Still another need exists for a method and system for edge-adaptive signal frame rate up-conversion that can provide a lower-cost means for improving the output signal quality to a video display monitor using a typical 50 Hertz PAL input signal.

In accordance with the present invention, a method and system for edge-adaptive signal frame rate up-conversion are provided that substantially eliminate or reduce disadvantages and problems associated with prior art television systems, such as those adhering to the PAL specification.

More specifically, one embodiment of the system for edge-adaptive frame rate up-conversion of the present invention comprises: a capture block for receiving and processing an input signal; a frame buffer to receive and process a data signal output from the capture block; an edge-adaptive interpolator to generate an interpolated field signal from a set of current input field signals output from the frame buffer; a motion detector to receive a composite signal output from the frame buffer and to process the composite signal to generate a motion signal; a blender to receive a prior input field signal from the frame buffer, the interpolated field signal from the edge-adaptive interpolator, and the motion signal, and generate an edge and motion-interpolated field signal; a synchronization control block to process an input vertical synchronization signal received from the capture block and generate an output synchronization signal and an output field parity signal; a comparator to receive and compare the output field parity signal and an input field parity signal output from the capture block; and a multiplexer to select, based on the output of the comparator, and provide as an up-converted output signal, either one of the set of current input field signals output from the frame buffer or the edge and motion-interpolated field signal. The input signal can comprise a PAL video signal at 50 Hertz. The up-converted output signal can comprise, for example, a 60 Hertz PAL output signal or a 75 Hertz PAL output signal.

A technical advantage of the method and system for edge-adaptive signal frame rate up-conversion of this invention is that they provide the ability to convert a 50 Hertz vertical refresh rate interlaced input signal to a 60 Hertz or higher vertical refresh rate output signal using the same or comparable scan circuit and picture tube as a 50 Hertz system.

A further technical advantage of the method and system for edge-adaptive signal frame rate up-conversion of this invention is the ability to provide a lower-cost means for improving the output signal quality to a video display monitor from a typical 50 Hertz PAL input signal.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION OF THE INVENTION

Preferred embodiments of the present invention are illustrated in the FIGUREs, like numerals being used to refer to like and corresponding parts of various drawings.

The present invention comprises various embodiments of a system and method for edge adaptive signal frame rate up-conversion that can be used to generate a 60 Hertz or higher vertical refresh rate output from a standard PAL 50 Hertz interlaced input signal. For example, embodiments of this invention can be used to convert a PAL 50 Hertz interlaced input signal to a 60 Hertz or a 75 Hertz vertical refresh rate output signal comparable in quality to a 100 Hertz up-converted output signal as known in the prior art. However, the embodiments of the present invention can be implemented using the same scan circuit and picture tube as currently existing PAL television systems, resulting in greatly reduced costs as compared to prior art 100 Hertz television systems.

Embodiments of the present invention can further comprise a motion adaptive field interpolation algorithm to generate an output field when an input signal field parity is different from the required output signal field parity. Similarly, embodiments of this invention can comprise a motion and edge adaptive vertical line number increasing method to increase the number of lines in a frame grid field for vertical scaling that will fill in missing lines using motion and edge adaptive processing. These embodiments and their associated advantages are discussed in greater detail below.

Prior art up-rate conversion systems can convert a 50 Hertz PAL input video signal to a higher vertical refresh rate (e.g., 100 Hertz) by one of two ways. The first is to perform a motion estimated (ME) conversion to generate additional output fields. This method can result in smooth motion, but is very complex and is difficult to implement. The second method is to repeat some of the input fields to generate the higher refresh rate. This method is simpler than the ME-based field rate up-conversion, but can result in motion shutter due to the simple field repetition used to generate additional required lines.

Figure 1:
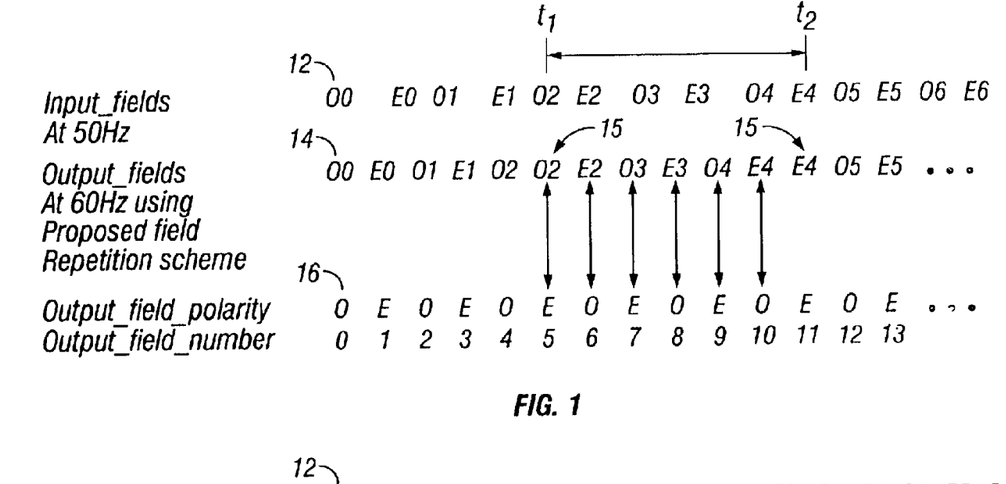
FIG. 1 provides an example of a 50 Hertz to a 60 Hertz field rate up-conversion sequence according to the teachings of the embodiments of this invention.
Figure 2:
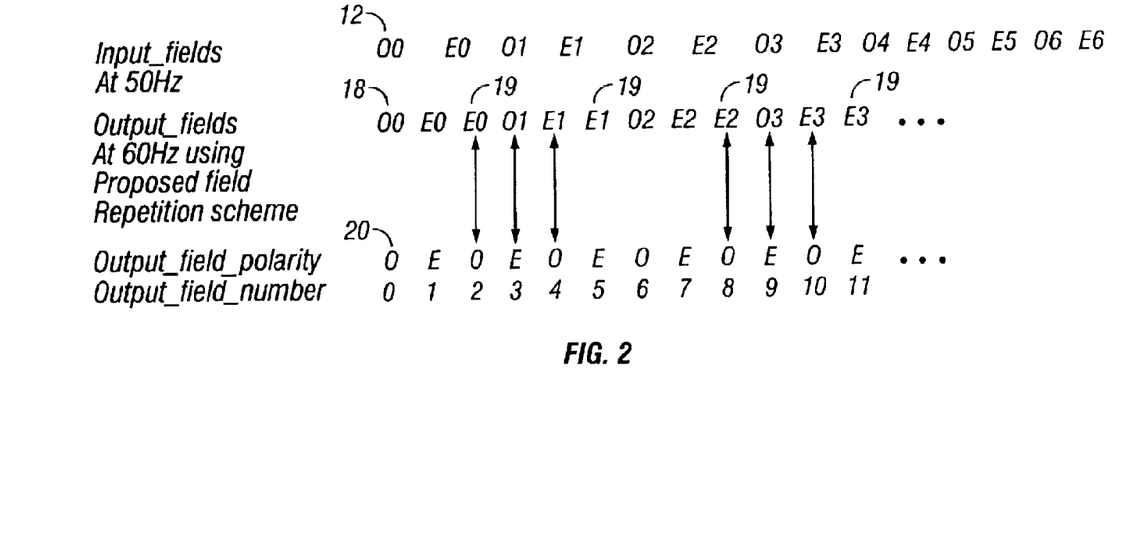
FIG. 2 shows a similar example of a field rate-up conversion from a 50 Hertz PAL input signal to a 75 Hertz vertical refresh rate output signal.

The embodiments of this invention adapt the field repetition scheme to up-convert a PAL 50 Hertz input video signal to, for example, a 60 Hertz or a 75 Hertz vertical refresh rate output signal. For example, embodiments of this invention can duplicate one out of every 5 input fields from a PAL 50 Hertz input signal to convert the 50 Hertz input signal into a 60 Hertz vertical refresh rate output signal. Similarly, one out of every two input fields can be repeated to convert from a 50 Hertz input signal to a 75 Hertz vertical refresh rate output signal. FIGS. 1 and 2 show the relationship between 50 Hertz PAL input fields and the output fields for a 60 Hertz and a 75 Hertz vertical refresh rate output signal, respectively.

FIG. 1 provides an example of a 50 Hertz to a 60 Hertz field rate up-conversion sequence according to the teachings of the embodiments of this invention. The input fields of the 50 Hertz PAL input signal alternate between odd and even fields because the signal is an interlaced signal. As can be seen in FIG. 1, 50 Hertz input fields 12 are converted to 60 Hertz output fields 14 using embodiments of the field repetition scheme of this invention. In the same timeframe, T1, in which the first five 50 Hertz input fields 12 are provided as inputs, six 60 Hertz output fields 14 must be generated in order to up-convert the 50 Hertz interlaced input signal to a 60 Hertz interlaced vertical refresh rate output signal. As represented in FIG. 1, every fifth 50 Hertz input field 12 is duplicated as a sixth 60 Hertz output duplicate field 15. Thus, every fifth output field 14 and every sixth 60 hertz output duplicate field 15 are identical and thus have the same parity. Because the output signal provided by the embodiments of this invention is an interlaced signal, the display output fields must alternate between odd and even fields. This means that the parity of output duplicate fields 15 may have to be changed to match the alternating polarities required to display the interlaced output signal properly. The required output field parities are shown as display output field 16 parities (raster field parities). The difference between the generated output field 14 parities and the raster field 16 parities thus must be taken into account and a parity conversion performed if required to maintain the interlaced alternating odd-even field parity scheme.

FIG. 2 shows a similar example of a field rate-up conversion from a 50 Hertz PAL input signal to a 75 Hertz vertical refresh rate output signal. 50 Hertz input fields 12 are converted to 75 Hertz output fields 18. To up-convert a 50 Hertz input signal to a 75 Hertz output signal, every other 50 Hertz input field 12 is duplicated as a generated 75 Hertz output duplicate field 19. The 75 Hertz output signal duplicate field 19 parities must be made to match the output field parities at the raster (display) before being output to the final display as raster output fields 20 in the same way as discussed with regards to FIG. 1.

The above described field rate up-conversion scheme of the embodiments of this invention can result in motion shutter problems. For a 60 Hertz up-conversion, motion shutter occurs every 60/6 fields, which is equal to 10 Hertz. In a 75 Hertz up-conversion mode, by contrast, the motion shutter occurs every 75/3fields, which is equal to 25 Hertz. These frequencies are arrived at by dividing the output signal frequency by the frequency of occurrence of the up rate-converted fields.

From a motion shutter point of view, the 75 Hertz scheme is thus more desirable than the 60 Hertz scheme. The motion in the 75 Hertz up-conversion scheme output signal display is smoother than that of the 60 Hertz scheme because the motion shutter happens at a greater frequency. Thus, field rate up-conversion from a 50 Hertz PAL input signal to a 75 Hertz vertical refresh rate interlaced output signal is preferred over a 60 Hertz field rate up-conversion. The costs to implement a 60 Hertz refresh rate up-conversion and a 75 Hertz refresh rate up-conversion are comparable. Further, other refresh rate up-conversions are possible using the embodiments of this invention, but above 75 Hertz they become progressively more expensive to implement. The closer the up-conversion frequency gets to 100 Hertz, the more likely it becomes that a different scan rate circuit and picture tube will be required.

In an interlaced system, there is a one line shift between each odd field and each even field. The embodiments of the field rate up-conversion method and system of this invention can duplicate some incoming fields to generate required output fields. Each input field and each output field has its own parity, alternating between odd and even, as required by the interlaced standard. The field rate up-conversion of the embodiments of this invention may, as described above, generate an odd field, while an even field is what is required by the display, or vice versa. This is due to the duplication of an input field to generate an output field, as discussed above with reference to FIGS. 1 and 2. Several methods may be used to generate the output field to be displayed from the input field.

The simplest method is to use the incoming field without any processing, regardless of the parity difference between the input fields 12 parity and the required corresponding output display fields parity. This method may lead to up/down shaking due to the possibility of displaying one parity field when the opposite parity field is what is required by the interlaced standard. This is especially true for images with high contrast vertical transitions.

A second method is to generate the required output field based on the parity of the input video field 12 in relation to the required display output field (e.g., display fields 15 and 19) parity. If the display output field parity is the same as the incoming video field 12 parity, then the display output field is identical to the input field 12. If the generated output field (e.g., output field 14 or 18) parity is opposite from that of the required display output field 12 parity, then vertical interpolation can be performed on the output field to convert the output field parity to match the parity of the required display output field. Vertical interpolation such as that disclosed in related U.S. patent application Ser. No. 10154628 entitled METHOD AND SYSTEM FOR EDGE-ADAPTIVE INTERPOLATION FOR INTERLACE-TO-PROGRESSIVE CONVERSION, filed May 24,2002 (the "Interpolation Application") can be used by the embodiments of this invention to perform this function.

By processing an input field 12 using vertical interpolation, the up/down shaking that could otherwise result is reduced or eliminated because the parity field difference is accounted for and corrected. However, for image areas with very sharp vertical edges, there may still be some noticeable shaking. This is because the up/down shaking is due to the field parity difference between the input and the output fields.

Figure 3:
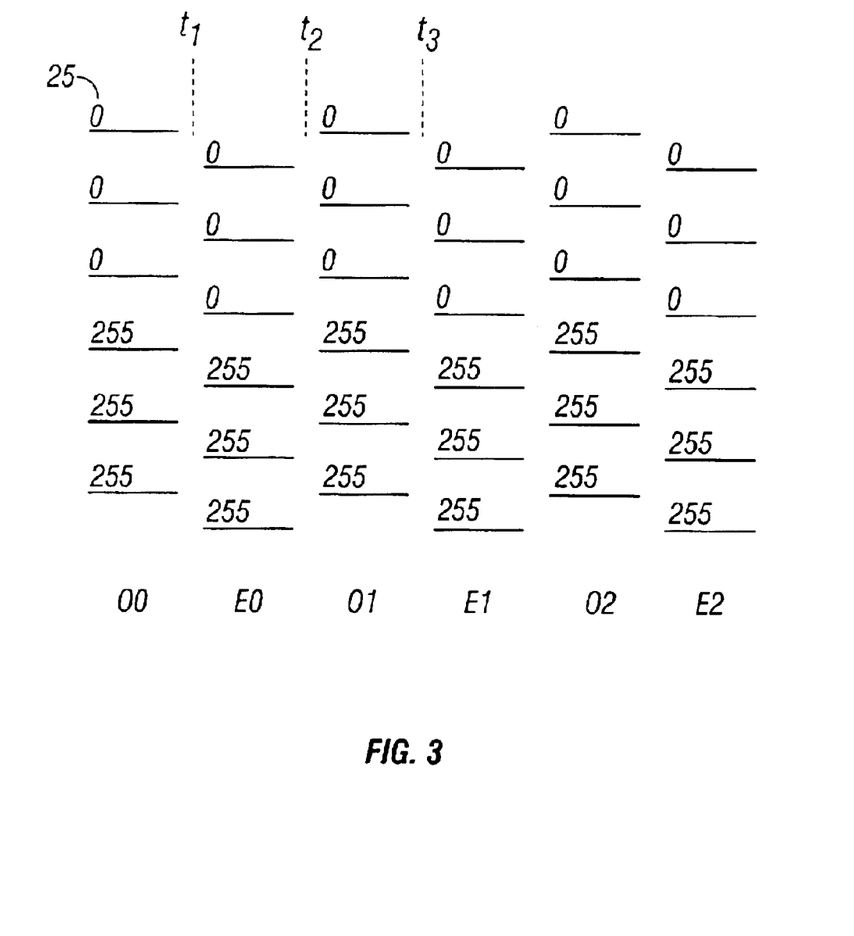
FIG. 3 is a field representation of an input video signal corresponding to a static image with very high vertical transitions.

FIG. 3 is a field representation of an input video signal corresponding to a static image with very high vertical transitions. The number on each field line 25 denotes the gray scale of that line. FIG. 3, as with other FIGUREs in this description used to represent video images, is a timereferenced representation of the odd and even fields in an interlaced image. As per the interlaced standard, at any one time only the odd fields are displayed, followed by the even and then the odd and so on, such that a complete image appears to the eye, although only half of the image fields are shown at one time. FIG. 3 displays multiple odd and even fields together in a time-sequenced representation for clarity of description only.

As can be seen in FIG. 3, there is a very sharp vertical transition about midway through the fields, as defined by the shift from those field lines 25 having a zero gray scale to the field lines 25 having a 255-value gray scale. On the video image itself, this would appear as a sharp transition from, for example, a white image portion to a black image portion.

Figure 4:
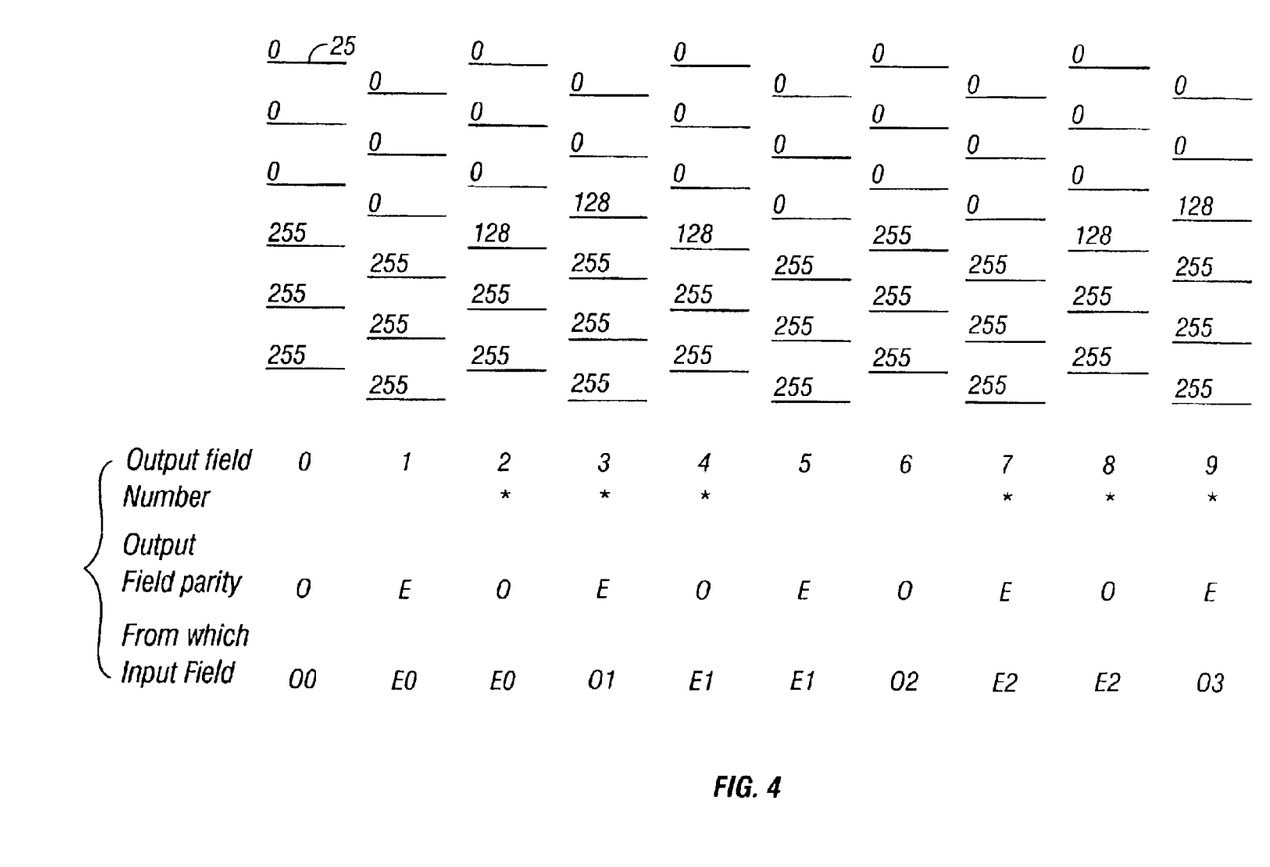
FIG. 4 shows the output field sequence, over time, of an output interlaced video image after a 50 Hertz to 75 Hertz up-rate conversion using an embodiment of the present invention with simple vertical interpolation.

FIG. 4 shows the output field sequence, over time, of an output interlaced video image after a 50 Hertz to 75 Hertz up-rate conversion using an embodiment of the present invention with simple vertical interpolation to generate the display output fields when the parity of the required display output field is different from the parity of a corresponding input field. FIG. 4 represents the image of FIG. 3 after refresh rate up-conversion in accordance with the teachings of the embodiments of this invention. Output field lines 25 with asterisks below their numbers represent an output field line generated using vertical interpolation. As can be seen, the vertical boundary at output field lines 25 numbers 2, 4 and 8 is a little bit lower and less sharp than the corresponding boundary in FIG. 3. At output field lines 25 numbers 3 and 9, the vertical boundary is a little bit higher and less sharp than the corresponding boundary in FIG. 3. The human eye can capture a slow up/down shaking boundary occurring at about every 75/6 times per second for field rate up-conversion of a 50 Hertz PAL input signal to a 75 Hertz vertical refresh rate output.

As can be seen in FIG. 4, a simple vertical interpolation simply averages the luminance values of the pixel above and of the pixel below a pixel to be generated within a field line to generate a corresponding pixel in the field line to be interpolated. Thus, in the generated field lines 25 numbers 2, 3, 4, 7, 8 and 9 of FIG. 4, the boundary field lines 25 at the outer edge that a gray scale value of 128, which is half of 255 plus 0 (the luminance values of the pixels in the field lines 25 immediately above and immediately below the interpolated field line). The boundary thus appears to shade into itself, resulting in the up/down shaking boundary condition.

Below the output field lines 25 of FIG. 4, a legend 26 indicates the output field line number, the corresponding output field parity (which alternates between odd and even as is required by the interlace standard), and the corresponding input field from which an output field has been generated. For field lines 25 numbers 2, 3, 4, 7, 8 and 9, the parity of the output field and the parity of the input field from which the output field has been generated are opposites. The parity is corrected to that required for the output display image by vertically interpolating the required lines and shifting them to be either odd or even, as required (i.e., to shift them from an odd to an even parity or from an even to an odd parity).

To overcome the problem of the up/down shaking boundary, the embodiments of this invention can incorporate a motion-adaptive field interpolation algorithm to generate an output field when an input field parity is different from that of the required display output field parity. To generate a field from an opposite parity field, the interpolation is controlled by the motion information of the image using the information of a previous input field together with the information of a current input field.

Figure 5:
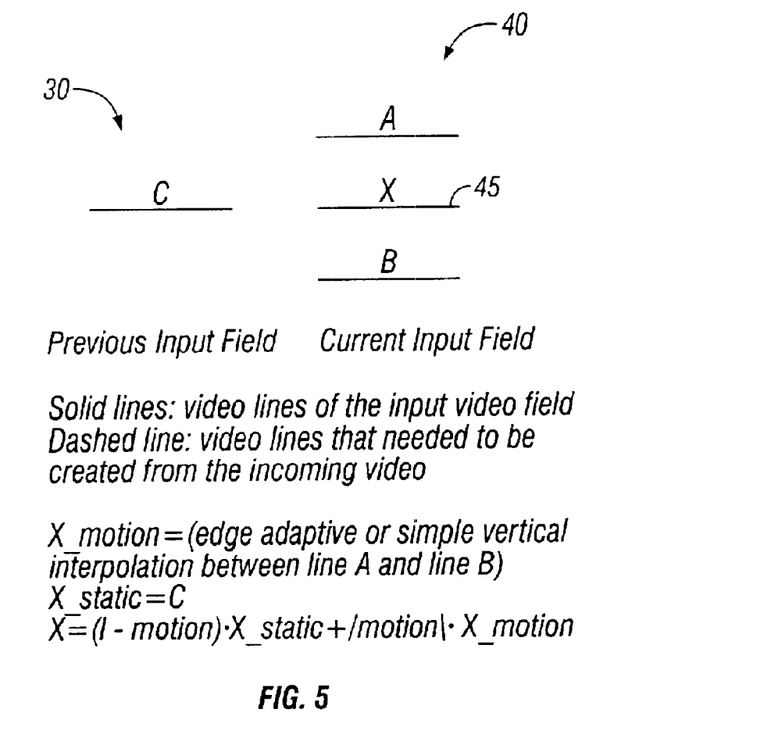
FIG. 5 shows one embodiment of the method of this invention incorporating motion-adaptive field interpolation to generate a new field.

FIG. 5 shows one embodiment of the method of this invention incorporating motion-adaptive field interpolation to generate a new field from the combination of a current input field and a previous input field when the output field parity is different from the current input field parity. FIG. 5 includes a previous input field 30 (here just one line of previous input field 30 is shown) and a current input field 40. Current input field 40 includes lines A and B (the lines above and below interpolated line 45, respectively). Interpolated line 45 is denoted by a dashed line to indicate that the field is to be generated from the current field (line A and line B belong to current field 40). Line C is a line of the previous input video field 30. Motion information is used to generate interpolated line 45. If a pixel to be generated within interpolated line 45 is a static pixel, then the embodiments of this invention simply take the corresponding pixel in line C of previous input field 30 and repeat it as a corresponding pixel in interpolated line 45. Thus, the vertical resolution is maintained for a static area of an image.

For motion pixels, the vertical edge adaptive interpolation (or a simple vertical interpolation) can be used to generate interpolated line 45 (i.e., the pixels comprising interpolated line 45). This process can remove sawtooth image defects due to the motion between the previous field 30 and the current field 40. In a practical application, motion of the fields will be represented by a motion factor comprising two or more bits from a motion detector to indicate the motion status of a pixel to be interpolated. The generation of pixels comprising interpolated line 45 is essentially a blending operation between the static result and a motion result based on this motion information. The pixels of interpolated line 45 can be generated according to the following equations:

$X\_motion$=(edge adaptive or simple vertical interpolation between line A and line B)

$X\_static$=Line C $X=((16-motion)*X\_static+motion*X\_motion)/16$.

The vertical interpolation or edge adaptive interpolation that can be used with the embodiments of this invention can be, for example, the motion and edge adaptive interpolation techniques as disclosed in the Interpolation Application, which was previously discussed and which is hereby fully incorporated by reference.

Figure 6:
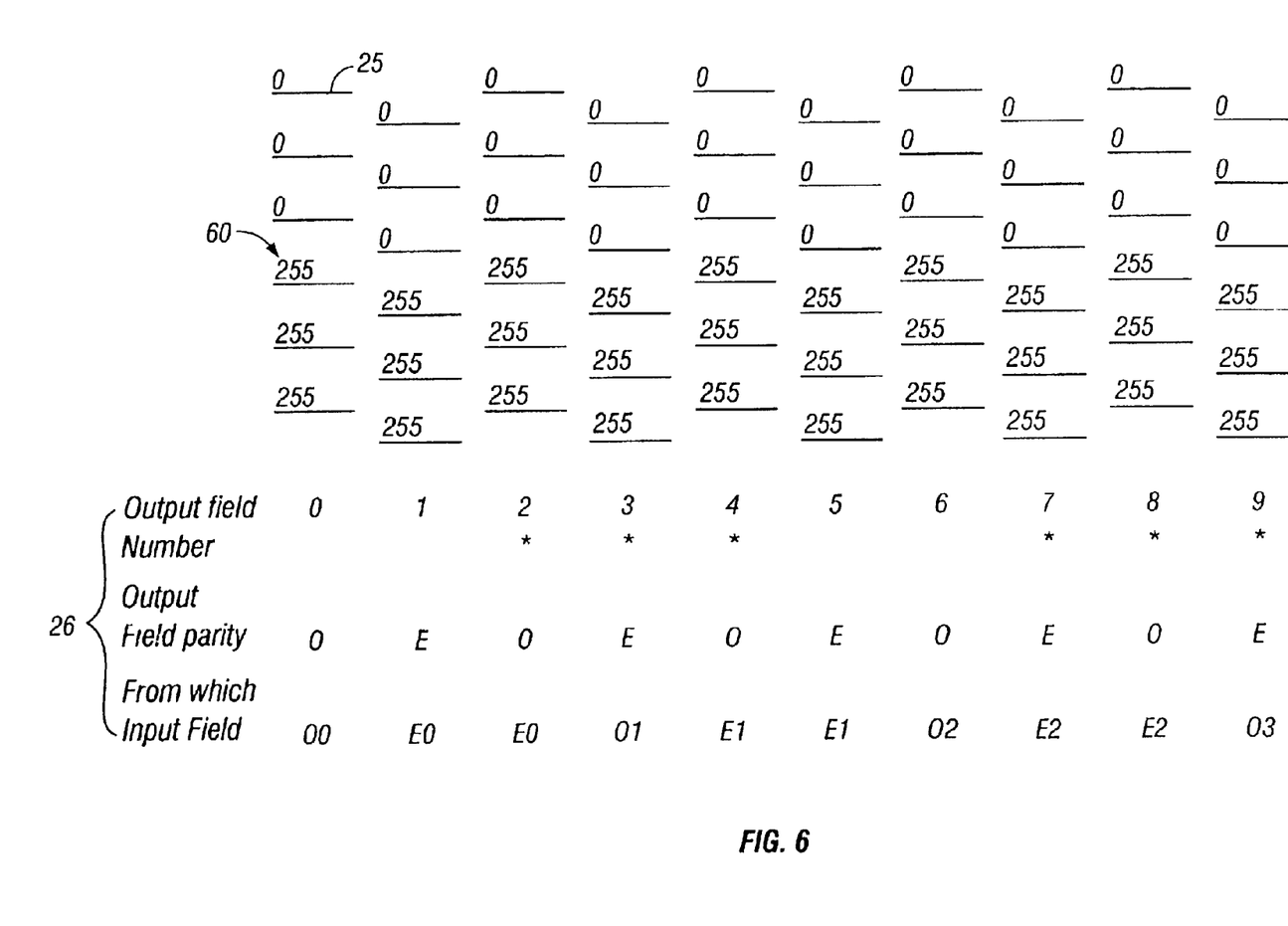
FIG. 6 shows the results of a 50 Hertz to 75 Hertz field rate up-conversion using the motion-adaptive interpolation scheme of some of the embodiments of the present invention.

FIG. 6 shows the results of a 50 Hertz to 75 Hertz field rate up-conversion using the above-described motion-adaptive interpolation of some of the embodiments of the present invention. It can be clearly seen in FIG. 6 that the slow up/down shaking around the vertical transition has been eliminated by maintaining the original image's sharp vertical transition. As compared to FIG. 4, the vertical transition now comprises a shift from a gray scale value of 0 to field lines 25 having a gray scale value of 255 along a boundary 60, corresponding to the sharp vertical transition of the original input signal fields. Unlike in FIG. 4, a simple averaging of gray scale (luminance) values along the transition for the interpolated fields is not used. The up/down shaking along the vertical transition is thus nonexistent.

Refresh rate up-conversion, as performed in accordance with the teachings of the embodiments of this invention, requires reconciling the odd to even field parity pattern of the input and output fields such that it correlates to the interlaced standard, otherwise image defects such as those discussed above can occur. Because it may be the case that field rate up-conversion results in an odd parity field when an even parity field is needed on the display (or vice versa), the embodiments of this invention can interpolate from one field to generate a new field with the correct parity (i.e., change the parity to the opposite value). Further, when determining the motion of the pixels in a field, the motion is determined in a range from 0 to 1. A "0" value corresponds to a static pixel and a "1" value corresponds to a maximum pixel motion. The motion value is not a binary value, but is instead a real value from 0 to 1, with 1 being the highest value of motion.

Thus, a blending operation can be performed between static processing (no motion) and motion processing. The motion value can be determined using a motion detector, which is, in essence a comparator that compares a previous field to a current field to determine if there is any motion between them. Motion detectors (comparators) are well-known to those in the art. Any such motion detector and motion detection algorithm can be used with the embodiments of this invention.

Figure 7:
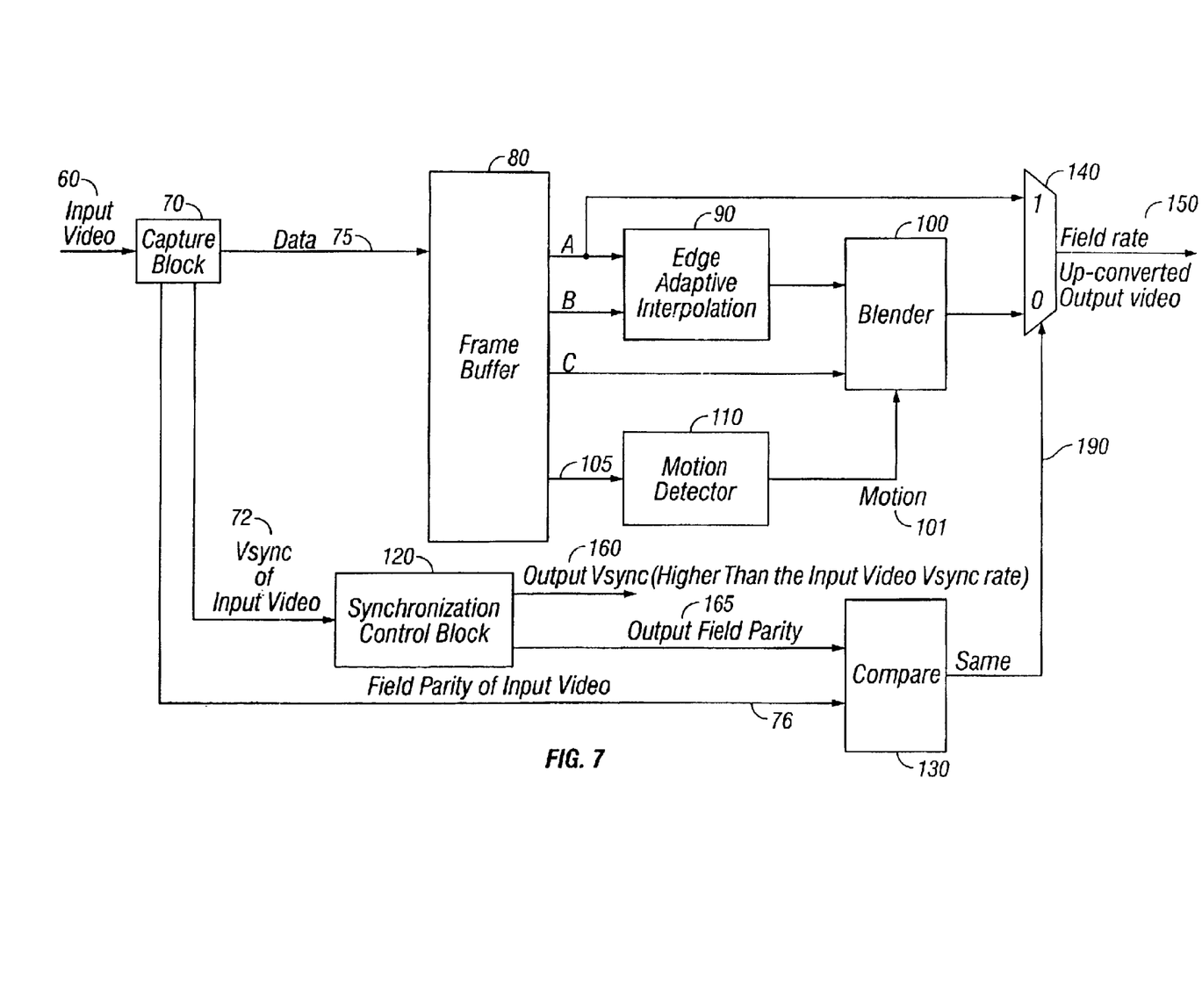
FIG. 7 is a logic block diagram of one embodiment of the field rate-up-converter using motion-adaptive processing of the present invention.

FIG. 7 is a logic block diagram of one embodiment of the field rate-up-converter using motion-adaptive processing of the present invention. Composite input video signal 60 is input to capture block 70. Composite input video signal 60 can comprise and NTSC or a PAL signal. Capture Block 70 processes composite input video signal 60 to generate and forward a data signal 75 (to frame buffer 80), an input field parity signal 76 (provided to comparator 130), and a V□sync signal 72 (provided as an input to synchronization control block 120). Frame buffer 80 can store multiple portions (e.g., frames) of a data signal and can provide as outputs multiple fields of an input video signal, such as current input field lines A and B, and previous input field line C. Frame buffer 80 can forward these outputs simultaneously to an edge-adaptive interpolator 90 (e.g., current input field lines A and B), to a blender 100 (e.g., prior input field line C) and to a motion detector 110, which takes as an input from frame buffer 80 a composite signal 105. Composite signal 105 can be a signal comprising motion information for the previous and the current input fields, such as the luminance and chrominance signal of the current field and the previous frame.

Edge-adaptive interpolator 90 can perform edge-adaptive interpolation to generate an interpolated line from current input field lines A and B, as, for example, per the teachings of the Interpolation Application. Motion detector 110, as previously described, compares current and prior input fields to detect motion between the two fields within a displayed image and provides a motion signal 107 to blender 100. Motion signal 107 can be a value from 0 to 1 to indicate the relative degree of motion between input fields. Current field information (e.g. line A) is also provided unprocessed to multiplexer 140. Blender 100 takes as inputs a motion signal 107, prior input field data (e.g., line C), and an output signal from edge-adaptive interpolator 90, comprising an interpolated field from current input field data (e.g., from lines A and B). Blender 100 takes these inputs and performs the functions previously described with respect to FIG. 5 for generating interpolated field 45 data of FIG. 5. Interpolated field 45 is provided as an output from blender 100 to multiplexer 140.

V-sync signal 72 is a vertical synchronization signal comprising the vertical refresh rate information for composite input video signal 60. Synchronization control block 120 processes v-sync signal 72 to generate an output vertical synchronization signal 160, corresponding to the field up-rate conversion frequency in accordance with the teachings of the embodiments of this invention, and an output field parity signal 165. Output vertical synchronization signal 160 can thus comprise, for example, a 60 Hertz signal or a 75 Hertz signal, whereas input v-sync signal 72 can comprise a 50 Hertz PAL signal. Output field parity signal 165 provides the parity of the available field to display. Output field parity signal 165 can be opposite from the input field parity provided as input field parity signal 76 to comparator 130.

Comparator 130 takes as inputs output field parity signal 165 and input field parity signal 76 and provides as an output a logical "1" if the parity signals are the same or a logical "0" if they are different. The output from comparator 130 is provided to multiplexer 140 as a selector signal 190. If the value of selector signal 190 is a logical "1", corresponding to the output field and input field parities being the same, multiplexer 140 selects as its output current input field data (e.g., line A). The output from multiplexer 140 is a field rate up-converted output video signal 150. If the value of selector signal 190 is a logical "1", the parity of the field available for display and the parity of the current input field from which the display field was generated are the same, and edge-adaptive interpolation is not required because the parity of the input and output signals do not need to be reconciled.

If instead the output field parity 135 is different from the input field parity 76, meaning that the interpolated field parity is different from the parity of the field available for display, then the output from comparator 130 is a logical "0". Selector signal 190 input to multiplexer 140 is thus a logical "0" and multiplexer 140 selects the input from blender 100 as its output (i.e., as field rate up-converted output video signal 150). In this case, field rate up-converted output video signal 150 comprises an edge-adaptive and motion-adaptive interpolated signal from current input field components (e.g., lines A and B), prior input field data (line C), and a motion signal 107 from motion detector 110. The selected output is generated using, in some embodiments, edge and motion adaptive interpolation, because the parity of the field to be displayed and the parity of the field from which the display field has been copied are different.

Televisions that have the capability to display the 75 HZ PAL signal will typically have a horizontal scan frequency that is higher than the normal PAL horizontal scan frequency of 15.625 KHZ. Such a television will have a horizontal scan frequency equal to 15.625*1.5 KHZ, due to the higher vertical refresh rate and because the number of lines per field is unchanged (625 lines per frame). Thus, vertical refresh rate is equal to the horizontal scan frequency/lines per field. For a normal PAL television signal, the vertical refresh rate is equal to 15625/(625/2)=50 HZ. Therefore, to achieve the 75 HZ display with the lines/field unchanged requires a horizontal scan frequency of 15.625*1.5.

For an NTSC input on this type of television, there is no large area flicker problem. However, there is still a visible data scan line structure problem. Because there is no large area flicker, it is desirable not to create motion jitter on an up-rate converted NTSC input signal. For an NTSC input signal, the NTSC specification 60 Hertz vertical refresh rate can be maintained and provides a satisfactory display. Because the horizontal scan frequency is higher for an NTSC signal (e.g., for a 75 Hertz television system, the horizontal frequency is 15.625×1.5 kHertz), this means there are more scan lines possible on an NTSC input (1.5× that for a 75i television). The visible line structure problem will then be resolved. The embodiments of the present invention can further comprise a vertical zoom (e.g., a vertical scaling to create more lines per field) on the input signal to generate a corresponding output field with more lines (for example, on a 75i television, the output field will have 240×1.5=360 active lines). This is because a normal NTSC signal comprises 240 lines per field. Thus, with a vertical scale-up factor of 1.5, the number of lines per field is 360.

The simplest way to increase the vertical line number of a PAL input is to perform a vertical scaling based on the information from one field. For example, a 1.5× scale-up factor is required for a 75i television. This kind of television can accept both PAL and NTSC signals, but due to the 75i for PAL, the horizontal scan frequency is 1.5× higher. To reduce the system cost, it is desirable to keep the same horizontal scan frequency for both the PAL and NTSC inputs. However, for an NTSC input, the vertical refresh rate is not increased, which means a 1.5× vertical scale-up is needed for the NTSC input to achieve the same horizontal scan frequency as that of the 75i PAL input. For the motion parts of an image, this method is satisfactory and will not create side effects. For the static part of the image, especially for areas with high contrast vertical edges, the resolution will be degraded.

For the static image area, vertical resolution can be double as compared with the motion parts. If vertical scaling is based on one frame information (two fields) to form an output field, then the picture quality will be largely improved. This means that the line numbers of a field can be increased by at least two methods. Field based vertical scaling is better for motion potions of an image and frame based vertical interpolation is better for the static portions of an image.

The embodiments of the present invention can use a motion and edge adaptive vertical line number increasing method to increase the line numbers in one field. The vertical scaling can be done on a frame grid with half of the lines from the current field and the missing lines can be generated using motion and edge adaptive processing as, for example, disclosed in the Interpolation Application.

Figure 8:
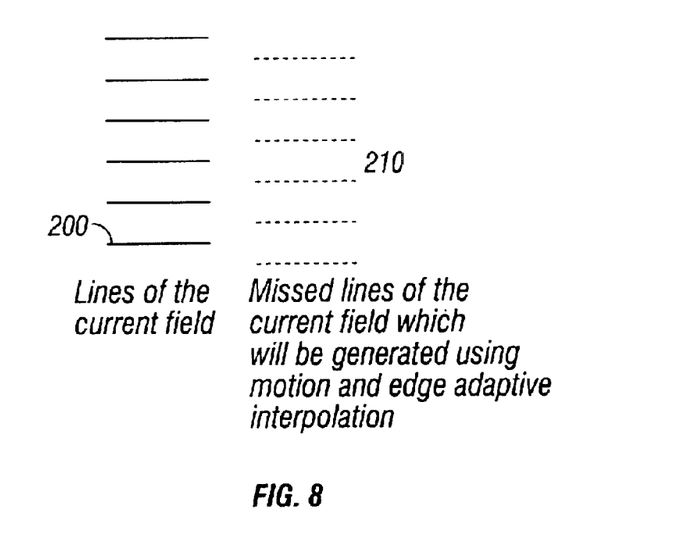
FIG. 8 shows a grid that can be used to perform vertical interpolation in accordance with the teachings of the embodiments of this invention.

FIG. 8 shows a grid that can be used to perform vertical interpolation in accordance with the teachings of the embodiments of this invention. Solid lines 200 of FIG. 8 represent the lines of a current field, while the dashed lines 210 represent the missing lines in an interpolated field that can be generated using motion and edge adaptive line number increasing. The process for generating the missing lines 210 is the same as the method used in the 50i to 75i conversion as per the teachings of the embodiments of this invention. With this method, the up-converted output field will have good quality for both the static portions of an image and the motion portions of an image.

Embodiments of the method and system of this invention can be implemented as an algorithm that is hardwired into an integrated circuit, or they can be encoded as computer executable software instructions in any computer readable medium, such as a hard drive or integrated circuit RAM or ROM. Thus, the embodiments of this invention can be implemented for example on a CPU in a MIPS processor or in a custom made chip with etched in logic. Typically, embodiments of this invention can be hardwired to reduce the computational resources necessary to perform calculations for the interpolation and generation of missing lines. The embodiments of this invention can be implemented on an interlaced-to-progressive conversion chip, such as that disclosed in U.S. patent application entitled METHOD AND SYSTEM FOR SINGLE-CHIP INTEGRATION OF 3D Y/C COMB FILTER AND INTERLACE-TO-PROGRESSIVE CONVERTER, filed Oct. 20, 2001, which is hereby fully incorporated by reference.

In the foregoing specification, the invention has been described with reference to specific embodiments. However, one of ordinary skill in the art can appreciate that various modifications and changes can be made without departing from the scope of the present invention as set forth in the claims below. Accordingly, the specification and FIGUREs are to be regarded in an illustrative, rather than in a restrictive sense, and all such modifications are intended to be included within the scope of the present invention.

Benefits, other advantages and solutions to problems have been described above with regards to specific embodiments. However, the benefits, advantages, solutions to problems, and any element(s) that may cause any benefit, advantage, or solution to occur or become more pronounced are not to be construed as a critical, required, or essential feature or element of any or all the claims.

As used herein, the terms "comprising," "includes," "including," "has," "having," or any other variation thereof, are intended to cover a non-exclusive inclusion. For example, a process, method, article, or apparatus that comprises a list of elements is not necessarily limited only to those elements but may include other elements not expressly listed or inherent to such process, method, article, or apparatus. Further, unless expressly stated to the contrary, "or" refers to an inclusive "or" and not to an exclusive "or."

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A system for edge-adaptive frame rate up-conversion, comprising:

a capture block for receiving and processing an input signal;

a frame buffer to receive and process a data signal output from said capture block;

an edge-adaptive interpolator to generate an interpolated field signal from a set of current input field signals output from said frame buffer;

a motion detector to receive a composite signal output from said frame buffer and process said composite signal to generate a motion signal;

a blender to receive a prior input field signal from said frame buffer, said interpolated field signal from said edge-adaptive interpolator, and said motion signal and generate an edge and motion-interpolated field signal;

a synchronization control block to process an input vertical synchronization signal received from said capture block and generate an output synchronization signal and an output field parity signal;

a comparator to receive and compare said output field parity signal and an input field parity signal output from said capture block; and a multiplexer to select, based on the output of said comparator, and provide as an up-converted output signal, either one of the set of said current input field signals output from said frame buffer or said edge and motion-interpolated field signal;

wherein said set of current input field signals comprises a first current input field signal and a second current input field signal, each comprising pixel data for a corresponding first and second input field display lines; and wherein said edge-adaptive interpolator is operable to perform edge-adaptive interpolation to generate said interpolated field signal from said first and second current input field signals, and wherein said interpolated field signal comprises pixel data for a corresponding interpolated field display line.

2. A system for edge-adaptive frame rate up-conversion, comprising:
a capture block for receiving and processing an input signal;
a frame buffer to receive and process a data signal output from said capture block;
an edge-adaptive interpolator to generate an interpolated field signal from a set of current input field signals output from said frame buffer;
a motion detector to receive a composite signal output from said frame buffer and process said composite signal to generate a motion signal;
a blender to receive a prior input field signal from said frame buffer, said interpolated field signal from said edge-adaptive interpolator, and said motion signal and generate an edge and motion-interpolated field signal;
a synchronization control block to process an input vertical synchronization signal received from said capture block and generate an output synchronization signal and an output field parity signal;
a comparator to receive and compare said output field parity signal and an input field parity signal output from said capture block; and
a multiplexer to select, based on the output of said comparator, and provide as an up-converted output signal, either one of the set of said current input field signals output from said frame buffer or said edge and motion-interpolated field signal;
wherein said composite signal comprises motion information for said prior input field signal and motion information for said set of current input field signals; and
wherein said motion detector comprises a comparator for comparing said prior input field motion information with said motion information for a current input field signal from said set of current input field signals to detect motion between fields of a displayed image.

3. A system for edge-adaptive frame rate up-conversion, comprising:
a capture block for receiving and processing an input signal;
a frame buffer to receive and process a data signal output from said capture block;
an edge-adaptive interpolator to generate an interpolated field signal from a set of current input field signals output from said frame buffer;
a motion detector to receive a composite signal output from said frame buffer and process said composite signal to generate a motion signal;
a blender to receive a prior input field signal from said frame buffer, said interpolated field signal from said edge-adaptive interpolator, and said motion signal and generate an edge and motion-interpolated field signal;
a synchronization control block to process an input vertical synchronization signal received from said capture block and generate an output synchronization signal and an output field parity signal;
a comparator to receive and compare said output field parity signal and an input field parity signal output from said capture block; and
a multiplexer to select, based on the output of said comparator, and provide as an up-converted output signal, either one of the set of said current input field signals output from said frame buffer or said edge and motion-interpolated field signal;
wherein said motion signal can have a real value between zero and one to indicate the degree of motion between a current input field signal, from said set of current input field signals, and said prior input field signal, and wherein generating said edge and motion-interpolated signal at said blender comprises:
  if said motion signal has a value of zero, then setting said edge and motion-interpolated signal equal to said interpolated field signal; else
  if said motion signal has a value greater than zero, then setting said motion interpolated signal equal to the sum of the product of (1-said motion signal value) and said prior input field signal and the product of said interpolated field signal and said motion signal value.

4. A system for edge-adaptive frame rate up-conversion, comprising:
a capture block for receiving and processing an input signal;
a frame buffer to receive and process a data signal output from said capture block;
an edge-adaptive interpolator to generate an interpolated field signal from a set of current input field signals output from said frame buffer;
a motion detector to receive a composite signal output from said frame buffer and process said composite signal to generate a motion signal;
a blender to receive a prior input field signal from said frame buffer, said interpolated field signal from said edge-adaptive interpolator, and said motion signal and generate an edge and motion-interpolated field signal;
a synchronization control block to process an input vertical synchronization signal received from said capture block and generate an output synchronization signal and an output field parity signal;
a comparator to receive and compare said output field parity signal and an input field parity signal output from said capture block; and
a multiplexer to select, based on the output of said comparator, and provide as an up-converted output signal, either one of the set of said current input field signals output from said frame buffer or said edge and motion-interpolated field signal;
wherein said output synchronization signal comprises a vertical synchronization signal corresponding to a desired field up-rate conversion frequency and wherein said output field parity signal comprises the parity of a display field.

5. The system of claim 4, wherein said desired up-rate conversion frequency is 60 Hertz and wherein the frequency of said input vertical synchronization signal is 50 Hertz.

6. The system of claim 4, wherein said desired up-rate conversion frequency is 75 Hertz and wherein the frequency of said input vertical synchronization signal is 50 Hertz.

7. A system for edge-adaptive frame rate up-conversion, comprising:
a capture block for receiving and processing an input signal;
a frame buffer to receive and process a data signal output from said capture block;

an edge-adaptive interpolator to generate an interpolated field signal from a set of current input field signals output from said frame buffer;

a motion detector to receive a composite signal output from said frame buffer and process said composite signal to generate a motion signal;

a blender to receive a prior input field signal from said frame buffer, said interpolated field signal from said edge-adaptive interpolator, and said motion signal and generate an edge and motion-interpolated field signal;

a synchronization control block to process an input vertical synchronization signal received from said capture block and generate an output synchronization signal and an output field parity signal;

a comparator to receive and compare said output field parity signal and an input field parity signal output from said capture block; and a multiplexer to select, based on the output of said comparator, and provide as an up-converted output signal, either one of the set of said current input field signals output from said frame buffer or said edge and motion-interpolated field signal;

wherein said comparator outputs a logical "1" if said output field parity signal and said input field parity signal have the same parity, and wherein said comparator outputs a logical "0" if said output field parity signal and said input field parity signal have opposite parity; and wherein;

if said comparator output is a logical "1", said multiplexer selects said one of said current input field signals to provide as an up-converted output signal; and if said comparator output is a logical "0", said multiplexer selects said edge and motion-interpolated field signal to provide as an up-converted output signal.

* * * * *